A. F. HARTZELL.
MANUFACTURE OF BAKED GOODS.
APPLICATION FILED NOV. 27, 1918.
1,350,278.
Patented Aug. 17, 1920.
2 SHEETS—SHEET 1.
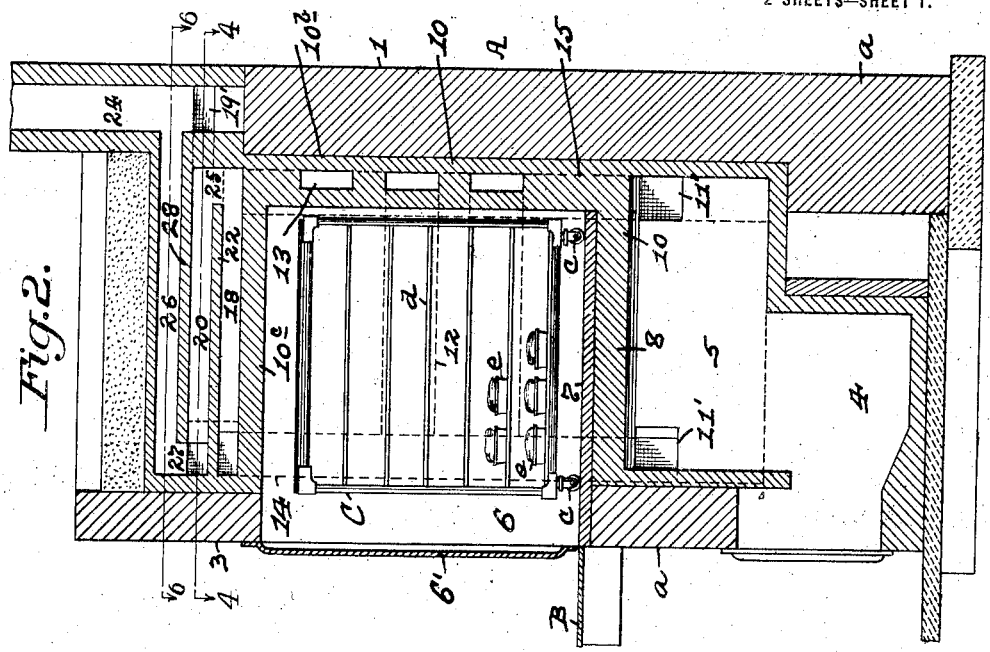
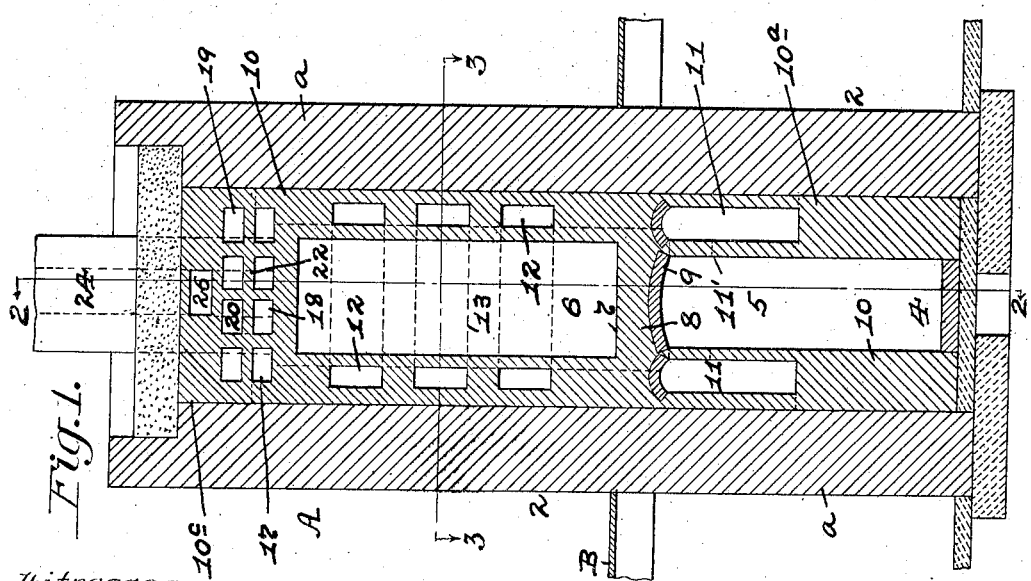

A. F. HARTZELL.
MANUFACTURE OF BAKED GOODS.
APPLICATION FILED NOV. 27, 1918.
1,350,278.
Patented Aug. 17, 1920.
2 SHEETS—SHEET 2.
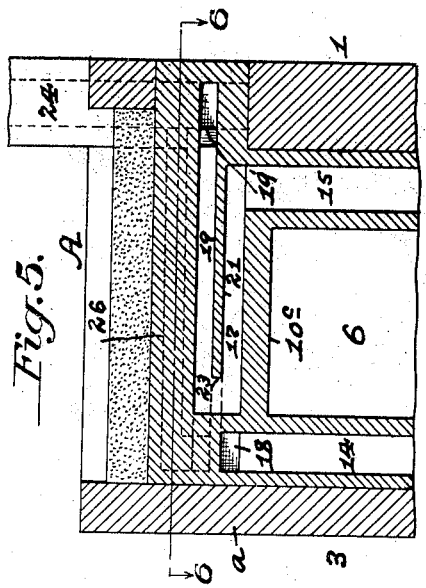
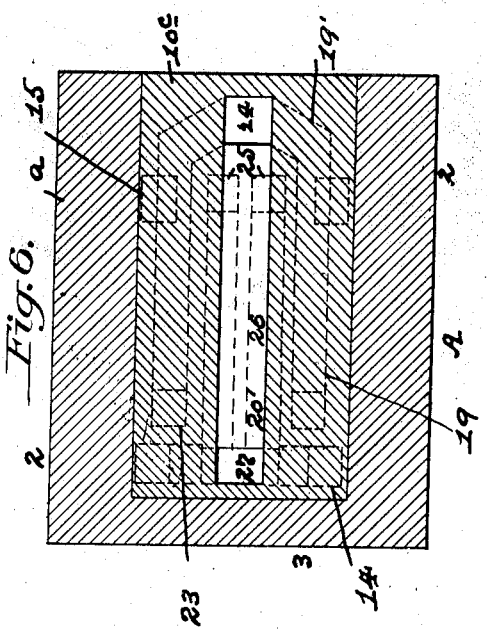
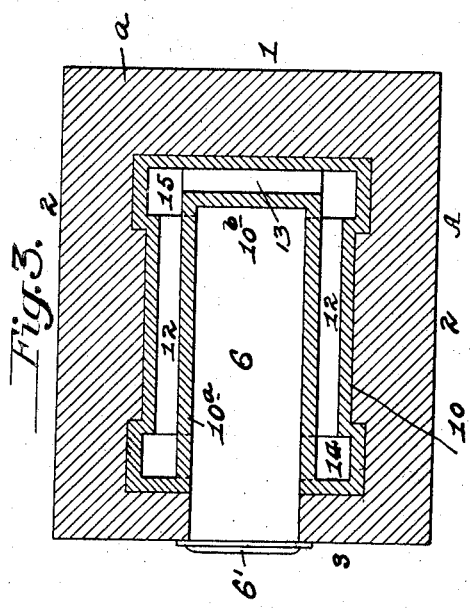
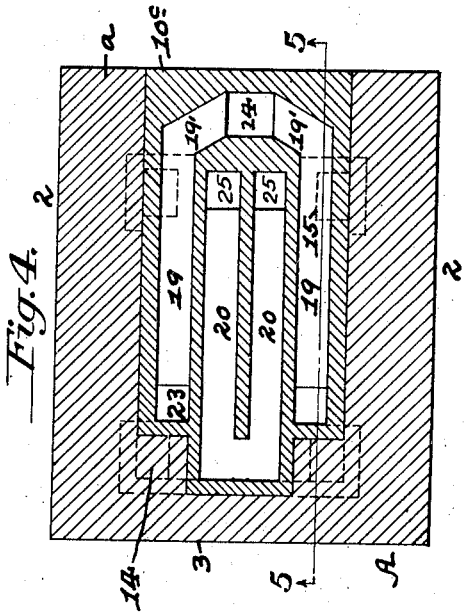
Witnesses
J. M. Geoghegan.
J. E. Jackson.
Inventor
Amos F. Hartzell.
By J. N. Cooke,
Attorney.

UNITED STATES PATENT OFFICE.

AMOS F. HARTZELL, OF KNOXVILLE BOROUGH, PENNSYLVANIA, ASSIGNOR TO STANDARD OVEN COMPANY, OF PITTSBURGH, PENNSYLVANIA.

MANUFACTURE OF BAKED GOODS.

1,350,278.  Specification of Letters Patent.  Patented Aug. 17, 1920.

Application filed November 27, 1918. Serial No. 264,318.

*To all whom it may concern:*

Be it known that I, AMOS F. HARTZELL, a citizen of the United States, and a resident of Knoxville borough, in the county of Allegheny and State of Pennsylvania, have invented a new and useful Improvement in the Manufacture of Baked Goods; and I do hereby declare the following to be a full, clear, and exact description thereof.

My invention relates to ovens, and has special reference to what are known as bakers' ovens for use in the baking of all classes of baked goods, such as bread, cakes and pastry.

The object of my invention is to provide a cheap, simple and efficient baker's oven, in which a large quantity of bread or other articles to be baked can be placed within the oven by a single operation, and when baked can also be removed by a single operation, thereby cheapening the cost of time and labor in handling such bread, and at the same time increasing the capacity and output of such oven.

To these ends my invention consists, generally stated, in the novel arrangement, construction and combination of parts, as hereinafter more specifically set forth and described and particularly pointed out in the claims.

To enable others skilled in the art to which my invention appertains to use my improved oven, I will describe the same more fully, referring to the accompanying drawings, in which—

Figure 1 is a vertical central section of a baker's oven embodying my invention;

Fig. 2 is a central section of the oven taken at right angles to that shown in Fig. 1 and on the line 2—2 Fig. 1, looking in the direction of the arrows;

Fig. 3 is a horizontal cross section of the oven on the line 3—3 Fig. 1, looking in the direction of the arrows;

Fig. 4 is a like view of the same taken on the line 4—4 Fig. 2 and looking in the direction of the arrows;

Fig. 5 is a vertical section of the upper portion of the oven taken on the line 5—5 Fig. 4 and looking in the direction of the arrows; and Fig. 6 is a horizontal cross section of the same on the line 6—6 Figs. 2 and 5 and looking in the direction of the arrows.

Like symbols of reference herein indicate like parts in each of the figures of the drawings.

As illustrated in the drawings A represents my improved baker's oven, which is formed of the usual brick work $a$, and is provided with the rear wall 1, side walls 2 and front wall 3. At the bottom of the oven A is the furnace portion 4, which is provided with the heating or firing chamber 5 within the same and having above such chamber the baking chamber 6, the bottom 7 of which is on a level with the shop floor B. The bottom 7 of the chamber 6 is formed by the top wall 8 of the heating chamber 5 and is provided with the arch 9 within the same and over the chamber 5.

Within the oven A and around the furnace 4 and baking chamber 6 is the fire-brick lining 10, and within the side portions $10^a$ of such lining and on each side of the heating chamber 5 is the horizontal flue 11, which communicates with each end of the chamber 5 by means of openings or flues 11' in such lining. Within each of the side portions $10^a$ and end portions $10^b$, respectively, of the lining 10 around the baking chamber 6 are a series of side flues 12 and a series of end flues 13, the corresponding flues 12 and 13 being in the same horizontal plane. The flues 11 and 12 are connected to each other at their ends by means of the corner flues 14 and 15, which are four in number, with the flues 14 at the front of the furnace A and the flues 15 at the rear of the same. Within the top portion $10^c$ of the lining 10 above the baking chamber 6 are the lower horizontal flues 17 and 18, the flues 17 being two in number, with one on each side of the two center flues 18 and which are between the side flues 17 and parallel therewith. Within such portion $10^c$ are also located the upper horizontal flues 19 and 20, which are arranged in like manner as the flues 17 and 18 and are directly above such flues 17 and 18 and in line therewith and with each other. The flues 17 are separated from the flues 19 by the partition wall 21 and the flues 18 are separated from the flues 20 by the partition wall 22. The side flues 17 connect with the upper ends of the rear corner flues 15 and with the side flues 19 above the same by means of the passage-way 23 at the front end of the partition wall 21 between such flues, and also connect at their rear ends with the stack or chimney flue 24 by the angular passage-ways 19'. The center flues 18 connect with the upper ends of the front corner flues 14 and with the center flues 20 above the same by means of the passage-way 25 at the rear end of the partition wall 22, and such flues 20 connect with the center flue 26 above the same at their front ends by means of the passage-way 27 at the front end of the partition wall 28 between the flues 20 and flue 26, and such flue 26 also connects at its rear end with the stack or chimney flue 24.

The use and operation of my improved oven is as follows: The ordinary approved form of a metal rack C is provided with the usual wheels or casters c for moving the rack along the shop floor B and when the shelves d on such rack are filled with the required amount of filled bread pans e, such rack is run along such floor into the baking chamber 6 of the oven A, and then the charging door 6' on the front of the chamber 6 is closed over said chamber. During the baking operation, the products of combustion from the furnace 4 will pass up into the heating chamber 5 against the bottom 7 of the baking chamber 6, and up through the openings 11' into the flues 11 and thence through the corner flues 14 and 15 into the flues 12 and 13 around the baking chamber 6, thus assisting in heating said chamber in connection with the products striking the said bottom. The products of combustion will then pass from the flues 12 and 13 through the rear corner flues 15 and up into the top flues 17, thence forward through the same into flues 19, and thence by the passage-ways 19' to the chimney 24. The products of combustion from the flues 12 and 13 will also pass up the front corner flues 14 into the top flues 18, thence into the flues 20 through the passageways 25 at the rear end of the same, thence into the flue 26 through the passage-way 27 at the front end of the same and thence into the chimney flue 24.

It will thus be seen that in the use of my improved method and oven the products of combustion from the furnace or firing chamber will pass around the baking chamber, containing the rack of bread therein in a tortuous course, so that such chamber will be thoroughly and completely heated thereby insuring the proper and rapid baking of the bread or other material on the rack, and thus doing away with the handling of each individual loaf of bread into the oven and out of the same, as well as doing away with the use and burning away of the well known paddles or peels commonly employed in this class of baking.

It will be evident that one or more racks of bread can be baked in the oven, that the flues employed around the baking chamber can be provided with any suitable means for cleaning the collection of dirt and carbon from the same, and that any well known form of furnace or other heating source can be employed, while various other changes in the design and construction of my improved oven may be resorted to without departing from the spirit of the invention or sacrificing any of its advantages.

What I claim as my invention and desire to secure by Letters Patent is:

1. A baking oven comprising a furnace portion, a baking chamber above said furnace portion, means for heating the top of the baking chamber including a pair of horizontally spaced substantially horizontal flues, a second pair of horizontally spaced substantially horizontal flues, each of the last mentioned flues being vertically spaced with respect to one of the first mentioned flues and in communication therewith, flue means connecting the first mentioned pair of flues with the furnace portion, an outlet having the second pair of flues communicating therewith, the products of combustion being directed forwardly and then rearwardly with respect to the baking chamber through said pairs of flues, a third pair of vertically spaced substantially horizontal flues displaced between the other pair of flues, one of the same being in communication with said outlet, and a flue means connecting the other or said third pair of flues with the furnace portion, the third pair of flues being adapted to direct the products of combustion rearwardly and then forwardly with respect to the baking chamber.

2. A baking oven comprising a furnace portion, a baking chamber above said furnace portion, means for heating the top of the baking chamber including a pair of horizontally spaced substantially horizontal flues, a second pair of horizontally spaced substantially horizontal flues, each of the last mentioned flues being vertically spaced with respect to one of the first mentioned flues and in communication therewith, flue means connecting the first mentioned pair of flues with the furnace portion, an outlet having the second pair of flues communicating therewith, the products of combustion being directed forwardly and then rearwardly with respect to the baking chamber through said pairs of flues, two pairs of substantially horizontally intermediate flues disposed between the other pairs of flues, one of the pairs of the intermediate flues being disposed above the other and in communication therewith at one end, a single substantially horizontal flue positioned above the uppermost pair of intermediate flues and in communication therewith at one end, the other end of said single flue being in communication with said outlet, and a flue means connecting the lowermost pair of intermediate flues with the furnace portion, said lowermost intermediate pair of flues being adapted to direct the products of combustion rearwardly to the rear end of the upper pair of intermediate flues for forward direction thereby, the single flues being adapted to direct said products of combustion rearwardly from the front end of the upper pair of intermediate flues to the outlet.

3. A baking oven comprising a furnace portion, a substantially rectangular baking chamber disposed above said furnace portion, a vertical flue adjacent each corner of the baking chamber, means for heating the top of the baking chamber including a pair of horizontally spaced substantially horizontal flues, a second pair of horizontally spaced substantially horizontal flues, each of the last mentioned flues being vertically spaced with respect to one of the first mentioned flues and in communication therewith at its front end, the rear ends of the first mentioned pair of flues being connected respectively with the rear vertical flues, a chimney outlet having the rear end of the second pair of horizontal flues in communication therewith whereby the products of combustion will be directed forwardly and then rearwardly with respect to the baking chamber through said pairs of flues, two pairs of substantially horizontal intermediate flues disposed between the other pair of flues, one of the pairs of intermediate flues being disposed above the other and in communication therewith at its rear ends, the front ends of the lowermost pair of intermediate flues being in communication respectively with the front vertical flues, a single substantially horizontal flue positioned above the uppermost pair of intermediate flues and having its front end in communication with the front ends thereof, the rear end of said single flue being in communication with said outlet whereby to direct the products of combustion rearwardly to the rear end of the uppermost pair of intermediate flues for forward direction thereby, the single flues being adapted to direct said products of combustion rearwardly from the front end of the upper pair of intermediate flues to the outlet.

In testimony whereof I, the said AMOS F. HARTZELL, have hereunto set my hand.

AMOS F. HARTZELL.

Witnesses:
J. M. GEOGHEGAN,
J. N. COOKE.